Oct. 6, 1970  RYUSUKE SASAGAWA  3,532,557
BATTERY WITH ELECTROLYTE PASSAGEWAY BETWEEN CELLS
Filed July 26, 1967  3 Sheets-Sheet 1
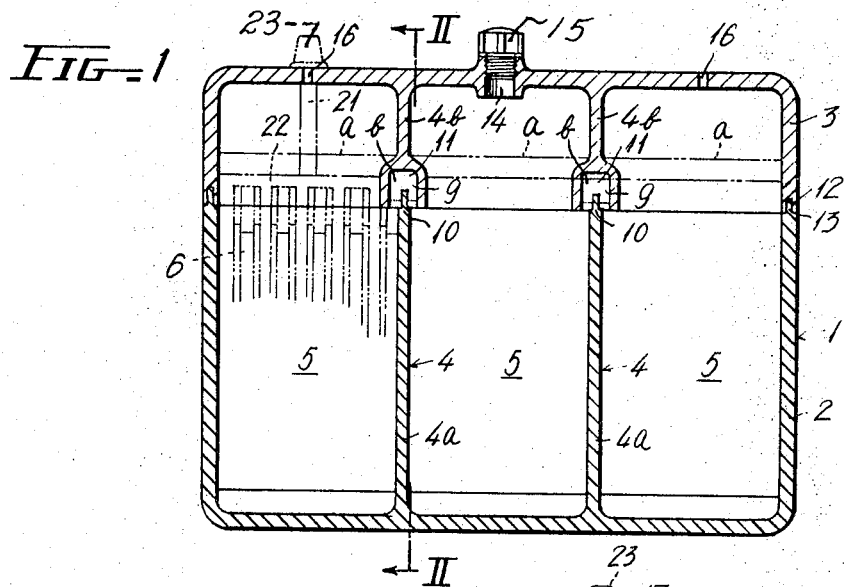
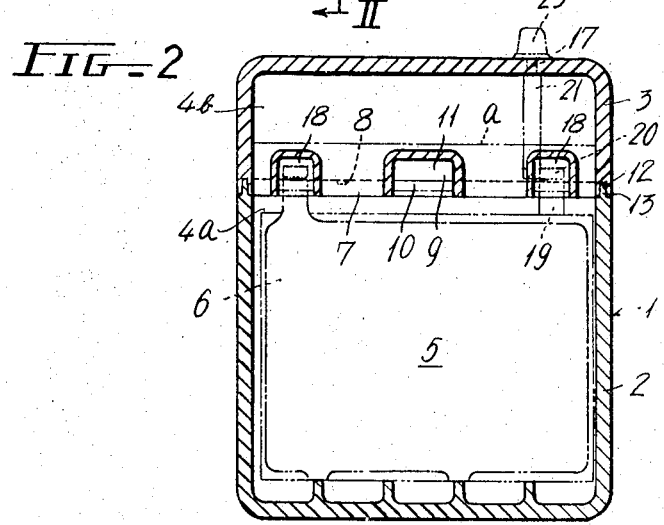
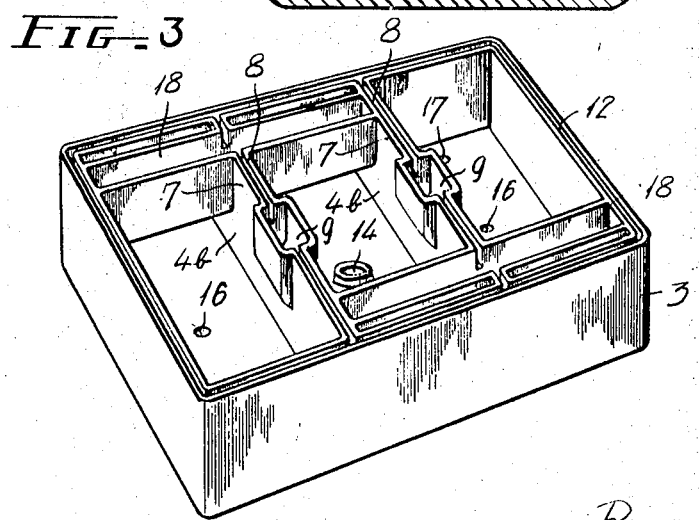
INVENTOR.
Ryusuke Sasagawa INVENTOR.
Ryusuke Sasagawa

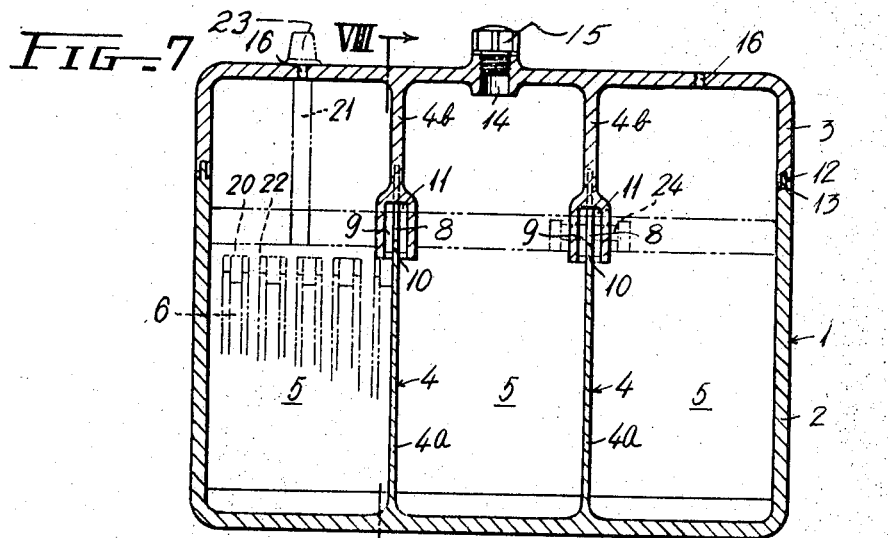

United States Patent Office 3,532,557
Patented Oct. 6, 1970

3,532,557
BATTERY WITH ELECTROLYTE PASSAGEWAY BETWEEN CELLS
Ryusuke Sasagawa, Yokohama-shi, Japan, assignor to Furukawa Denchi Kabushiki Kaisha, Yokohama-shi, Kanagawa-ken, Japan, a corporation of Japan
Filed July 26, 1967, Ser. No. 656,156
Int. Cl. H01m 1/02
U.S. Cl. 136—170                                 5 Claims

ABSTRACT OF THE DISCLOSURE

A storage battery assembly, which includes a plurality of adjacent cell compartments, in which a communicative passageway below the level of the electrolyte, includes an insulative gas layer between the electrolyte of adjacent cell compartments. Advantageously, the communicative passageway permits the electrolyte poured in one of the cell compartments to flow into the adjacent cell compartments, and thereby establish a uniform electrolyte level in all the cell compartments.

My invention relates to a storage battery assembly consisting of a plurality of adjacent cell compartments, and wherein the insulation of electrolyte between the adjacent cell compartments may be easily effected without the use of difficult sealing agents.

A storage battery assembly, particularly of the lead acid variety, typically includes a plurality of adjacent cell compartments. Each of the cell compartments includes appropriate positive and negative electrode plates and separators immersed in a suitable electrolyte. The plates of the individual cell compartments are then suitably interconnected to external posts of the cell casing. In such cell assemblies, it is desirable that the electrolyte level within each of the compartments be the same. This may be accomplished by providing communicative passageways between the adjacent cell compartments, below the level of the electrolyte, such that as the electrolyte is poured into one of the cell compartments, it will simultaneously and automatically fill up to the same level in the other cell compartments. However, means must be then provided for electrically insulating the electrolyte of the adjacent cell compartments. In the past, this has necessitated difficult and tedious assembly procedures. Further, should be sealing agent be damaged during repeated battery usage, the operation of the battery will be severely affected.

My invention avoids this by providing an extremely simple seal within the communicative passageways, which seal has also demonstrated improved reliability.

According to this invention, a partition between adjacent unit cell chambers is provided below the final level of the electrolyte with a communicative passageway. The communicative passageway is of a novel design, such that it has a captured volume of gas contained within an intermediate region thereof. The gas accumulated within this intermediate gas retaining space serves as an insulative barrier between the electrolyte of the adjacent cell compartments. As a further aspect of the instant invention, the communicative passageway may be formed of a sufficient size to allow the electrolyte to freely pass therethrough during the initial filling of the battery. This permits all of the chambers to be filled to the same level by the pouring of electrolyte into a filling opening in only one of the compartments. Thus, we avoid the conventional monobloc battery assembly, which requires a filling opening for each compartment cell, and thereby achieve a battery assembly which is simpler in construction, better in appearance, and facilitates maintaining the electrolyte level equal within all the cell compartments.

The communicative passageway is generally in the form of a U-shaped channel, with the arms of the U communicating with the electrolyte in the adjacent compartments, and the intermediate body portion of the U capturing the insulative gas retaining space after the electrolyte has reached the desired level.

Various embodiments of my invention are illustrated, in which the U-shaped re-entrant channel is provided by complementary sections of the main body housing, and the cover therefor. These complementary sections may either be provided in the partition walls or in the region adapted to receive the interconnecting terminal straps.

It is therefore seen that the principal object of my invention resides in providing an improved sealing means in the communicative passageway between adjacent battery cell compartments.

A further object of my invention is to provide a battery cell assembly in which a downwardly directed U-shaped channel in the partition wall separating adjacent cell compartments, includes an insulative gas retaining space.

A further object of my invention is to provide such a battery cell assembly, wherein the downwardly directed U-shaped channel is adapted to serve as an electrolyte passageway during the filling of the cell, and thereafter provides the insulative gas layer.

These as well as other objects of my invention will become readily apparent upon a consideration of the following description and drawings in which:

FIG. 1 is a sectional front view of one embodiment of this invention,

FIG. 2 is a sectional view taken along the line II—II in FIG. 1,

FIG. 3 is a reverse side view of a cover body,

FIG. 7 is a sectional front view of another embodiment thereof,

FIG. 8 is a sectional view taken along the line VII—VII in FIG. 7,

FIG. 9 is a reverse side view of a cover body,

FIG. 10 is a sectional front view of the principal part of another embodiment thereof, and FIG. 11 is a theoretically explanatory view of the construction of a gas retaining space.

Figure 4:
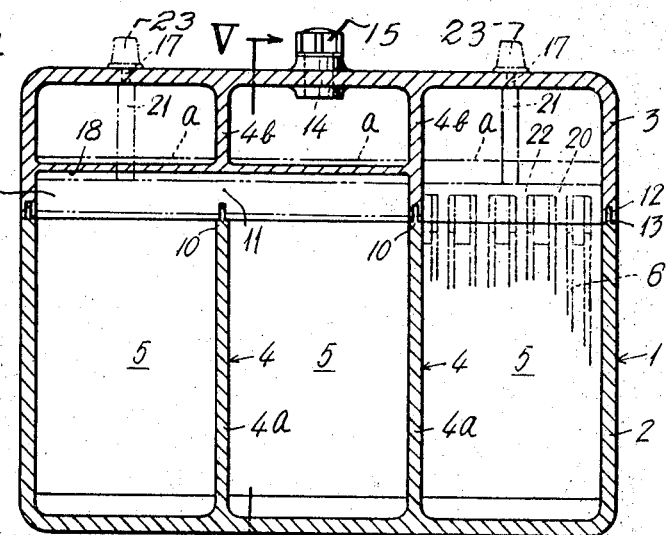
FIG. 4 is a sectional front view of another embodiment thereof.

FIGS. 1 to 3 show one embodying example of this invention. Numeral 1 denotes a monobloc battery container comprising a container body 2 and a cover body 3 which are tightly connected together and are both made of acid resistant synthetic resins such as polystyrene resin. The interior of the battery container 1 is divided into three unit cell chambers or compartments 5, 5 and 5 by two partition walls 4 and 4, each comprising a lower partition 4a of the container body 2 and a partition 4b of the cover body 3. Each cell chamber 5 contains electrode plates and separators to form a cell unit 6, and these units are electrically connected in series.

As best shown in FIG. 3, each partition 4b of the cover body 3 has along its lower edge 7 a fitting groove 8 and this groove 8 is enlarged at its central portion to form a hollow 9 having its bottom deeper than the fitting groove 8, so that when the cover body 3 is applied to the container body 2 a downwardly directing U-shaped channel 11 communicating at its both ends with the adjacent unit cell chambers 5 and 5 is formed between the hollow 9 and the upper edge 10 of the partition 4a in the fitting groove 8. This channel 11 serves as a gas retaining space, as will be described more in detail hereinafter. 12 is a fitting groove made in a peripheral edge of the cover body 3. After applying an adhesive agent to the groove 12, a projecting edge 13 of a peripheral edge of the container body 2 is fitted therein, whereby the container body 2 and the cover body 3 are tightly fixed together at their periphery. In this case, it is not necessary to apply any adhesive agent in the groove 8 of the partition 4b of the cover body 3. 14 is a filling opening bored in the central portion of the cover body 3, and 15 is a filling plug therefor. 16 is a vent opening made in the cover body 3 for each chamber 5, 17 is a hole for piercing a post, and 18 is a longitudinal groove for accommodating a strap 20 which connects ear 19 groups of the mutually opposite polarity electrode plates in the adjacent unit cell chambers 5 and 5, and which extends over the partition 4a of the container body 2.

A suitable adhesive agent is applied to the interior of the groove 18 so as to fix the groove 18 and the strap 20, namely, the cover body 3 and the unit cell 6. In the drawing, 21 shows a post upstanding from a terminal strap 22 of the extreme unit cell 7, and 23 shows a terminal thereof.

Thus, it is seen that the battery assembly 1 includes a plurality of adjacent cell compartments 5, 5, 5, separated by partition walls 4, with each of the partition walls including a communicative passageway 11 in the form of a downwardly directed U-shaped channel.

The theory of operation of the U-shaped channel may be understood by referring to FIG. 11, in which the U is shown being formed of a pair of arms H and an intermediate body-portion L. In the course of initially filling the battery assembly, the electrolyte is poured through the filling opening 14 in the central unit cell chamber 5, and flows into the adjacent cell chambers 5 by passing through the spaces 11, while the air within each chamber 5 is discharged to the exterior through the filling opening 14 and the vent openings 16 and 16. Pouring of the electrolyte is carried out until it closes the downwardly directed open ends of the space 11 and reaches a predetermined level a. Thus, by pouring the electrolyte only in the central chamber 5, all the chambers 5 can be filled with the same electrolyte and the level a of the electrolyte in all the chambers 5 can be automatically adjusted to be the same. In some time after the completion of the filling of the electrolyte, as the electrolyte penetrates into the plates and the separators, the gas contained therein becomes bubbles to rise and some of the bubbles enter the space 11 to be accumulated therein to form a gas layer b. This gas layer b divides the electrolyte within the space 11 into right and left, whereby the electrolyte in the adjacent unit cell chambers 5 and 5 is insulated one from another.

If it is desired that the space 11 serve only as an electrolyte insulation between the adjacent unit cell chambers 5 and 5, and it is not intended to serve also as an electrolyte passage, the space 11 may be comparatively small in size so that passing of the electrolyte therethrough may be impossible in practice. In this case, the filling opening 14 must be provided for each chamber 5.

Since bubbles are produced even in the charging of battery, the amount of the accumulated gas b in the space is always enough to ensure the electrolyte insulation during its use.

For insuring that the intermediate portion L of the downwardly directed U-shaped passageway provides insulation by an accumulation of gas, a means is provided to provide a substantial region free of the electrolyte. This is achieved by a sufficient length of the intermediate region L, substantially in excess of the partition wall. Further, a liquid repellent agent, such as paraffine, may be applied along the inner surface of region L. To prevent the escape of the accumulated gas in intermediate region L, the arm portions H are of a sufficient longitudinal length, which it is noted substantially exceeds the cross-sectional area of the passageway 11.

Figure 5:
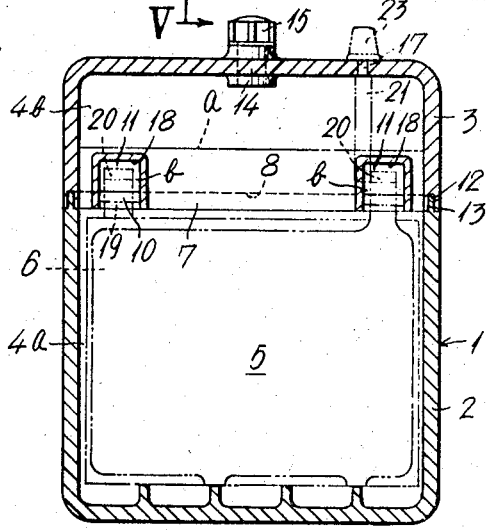
FIG. 5 is a sectional view taken along the line V—V in FIG. 4.
Figure 6:
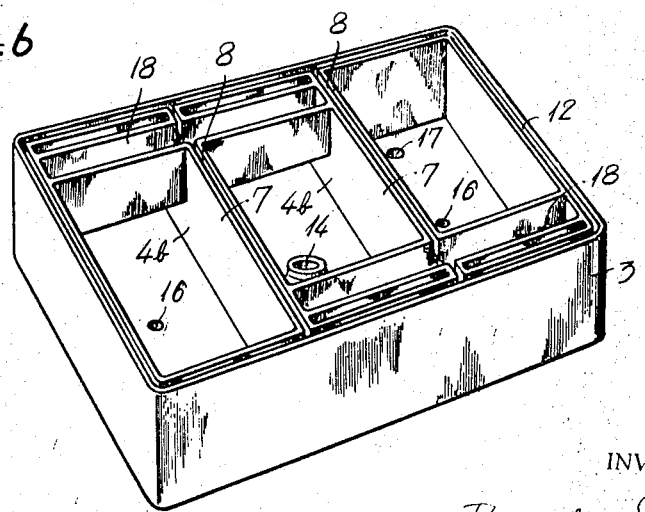
FIG. 6 is a reverse side view of a cover body.

FIGS. 4 to 6 show another example of this invention. In this embodiment, a groove 18 for accommodating a strap 20 in a cover body 3 is utilized as it is for forming a gas retaining space 11, and accordingly the cover body 3 as shown in FIG. 6 lacks such a hollow 9 as shown in the above-mentioned example, and has just the same construction as the cover body 3 in FIG. 3 in the other respects.

When the cover body 3 in FIG. 6 is applied to a container body 2, a space between the groove 18 and an upper edge 10 of the partition 4a fitted in the fitting groove 8 of the partition 4b of the cover body 3, forms a U-shaped channel serving as a gas containing space 11. In this case, the groove 18 is not applied with an adhesive agent.

FIGS. 7 to 9 show another embodiment of this invention. In this embodiment, a container body 2 and a cover body 3 forming a battery container 1 are made of thermoplastic resin which can be heat sealed such as polypropylene, and this battery is a monobloc battery, so called "through the partition type" in which a connecting rod 24 connecting between straps of adjacent unit cells 6 and 6 passes through a partition 4a of the container body 2. In this embodiment, the central portion of each partition 4b, having a groove 8 along its lower edge 7, of the cover body 3 is so extended downwardly that when the cover body 3 is applied to the container body 2 an extended lower portion 25 thereof may be positioned below the level of the electrolyte in the container body 2 and the groove 8 at the lower portion 25 is bulked sidewards to form a hollow 9 having its bottom deeper than the remaining portion of the fitting groove 8.

Meanwhile, the central portion 26 of the upper edge 10 of each partition 4a is lowered so as to fit the extended lower portion 25 of the cover body 3.

For integrally fixing the container body 2 and the cover body 3, the peripheral upper edge and the partition 4a upper edge of the container body 2 are kept under a softened condition by heating and the cover body 3 is applied thereto with its peripheral lower edge and the lower edge of each partition 4b thereof being kept under a softened condition by heating. Whereupon the upper edge of the container body 2 and the lower edge of the cover body 3 mounted therein are heat sealed to one another, but the central portion of the upper edge 10 of the partition 4a of the container body 2 and the bulked lower edge of the partition 4b of the cover body 3 are not heat sealed because they are apart one from another and thereby there is formed between them a reversed U-shaped channel 11 serving as a gas retaining space.

The spaces 11 of the above examples are all obtained by virtue of the cooperative engagement of the partition sections 4a and 4b of the main housing body 2 and cover 3. FIG. 10 shows an alternative arrangement, wherein the partitions 4a and 4b are in contact engagement along the entire length, with the communicative passageway 11 being formed by a U-shaped tube 27. U-shaped tube 27 is press fit within an opening of either partition 4a or 4b at a height below the level of the electrolyte.

It is therefore seen that my invention provides an efficient sealing means between the electrolyte of adjacent cell compartments, by providing an insulative gas retaining space in the communicative passageway between such compartments.

Although there has been described a variety of embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows.

1. A lead acid storage battery assembly comprising
   a housing having at least one pair of adjacent first and second cell compartments separated by a partition wall;
   each of said cell compartments including a lead acid battery cell comprising electrode plates and a liquid electrolyte;

a communicative passageway in said partition wall between said first and second cell compartments;

said communicative passageway being below the level of the liquid electrolyte in said cell compartment and in the form of a downwardly directed U-shaped channel for permitting said electrolyte to freely pass therethrough during an initial filling of the storage battery;

said communicative passageway also including a gas retaining space at an intermediate region thereof for capturing an insulative gas layer between the electrolyte of said adjacent first and second cell compartments for providing an electrically insulative barrier between the electrolytes of said cells;

with one of the arms of the U communicating with the electrolyte in said first compartment, with the other arm of the U communicating with the electrolyte in said second compartment, and with the intermediate body portion of the U providing said gas retaining space;

said housing including a main body portion and a cover;

said partition wall including first and second sections in said main body and cover respectively;

said first section including an upstanding wall, and said second section including an enlarged reentrant opening;

said upstanding wall seated within said reentrant opening and projecting into same a distance less than the depth of said reentrant opening, such that one of said arms is formed by the side of said reentrant opening along one surface of said upstanding wall, the other of said arms is formed by the side of said reentrant opening along another surface of said upstanding wall, and the intermediate body portion is formed by the region of said reentrant opening above said upstanding wall.

2. A lead acid storage battery assembly as set forth in claim 1:
each of the arms of said U having a length substantially exceeding the cross-sectional area of said intermediate body portion.

3. A lead acid storage battery assembly comprising a housing having at least one pair of adjacent first and second cell compartments separated by a partition wall;

each of said cell compartments including a lead acid battery cell comprising electrode plates and a liquid electrolyte;

a communicative passageway in said partition wall between said first and second cell compartments;

said communicative passageway being below the level of the liquid electrolyte in said cell compartment;

said communicative passageway also including a gas retaining space at an intermediate region thereof for capturing an insulative gas layer between the electrolyte of said adjacent first and second cell compartments;

said housing including a main body portion and a cover;

said partition wall including first and second sections in said main body and cover respectively;

said first section including an upstanding wall, and said second section including an enlarged reentrant opening;

said upstanding wall seated within said reentrant opening and projecting into same a distance less than the depth of said reentrant opening, such that a first arm is formed by the side of said reentrant opening along one surface of said upstanding wall, a second arm is formed by the side of said reentrant opening along another surface of said upstanding wall, and an intermediate body portion is formed by the region of said reentrant opening above said upstanding wall.

4. A lead acid storage battery assembly as set forth in claim 3:
said intermediate body portion having a length substantially in excess of the width of its partition wall.

5. A lead acid storage battery assembly as set forth in claim 4:
each of said arm having a length substantially exceeding the cross-sectional area of said intermediate body portion.

References Cited

UNITED STATES PATENTS

| 190,684 | 5/1877 | Jennison | 136—162.05 |
| 1,807,595 | 6/1931 | Kershaw | 136—162.5 |
| 2,662,108 | 12/1953 | Coates | 136—162.05 |

FOREIGN PATENTS

| 272,013 | 6/1927 | Great Britain. |

WINSTON A. DOUGLAS, Primary Examiner

D. L. WALTON, Assistant Examiner

U.S. Cl. X.R.

136—162